United States Patent [19]

Kassfeldt

[11] 4,258,292

[45] Mar. 24, 1981

[54] FLASHER DEVICES FOR LAMPS

[75] Inventor: Hillar Kassfeldt, Burlington, Canada

[73] Assignee: Tridon Limited, Burlington, Canada

[21] Appl. No.: 34,455

[22] Filed: Apr. 27, 1979

[51] Int. Cl.³ ............... H05B 41/30; H05B 41/34
[52] U.S. Cl. .............................. 315/200 A; 315/77;
340/81 R; 340/331; 307/10 LS
[58] Field of Search ............... 315/200 A, 77, 205,
315/209 R, 227 R, 131, 136; 307/10 LS;
340/641, 642, 81 R, 331

[56] References Cited
U.S. PATENT DOCUMENTS

| 3,002,127 | 9/1961 | Grontkowski | 315/136 |
| 3,728,713 | 4/1973 | Alten | 315/200 A |
| 4,086,565 | 4/1978 | Schorter | 315/77 |

Primary Examiner—Alfred E. Smith
Assistant Examiner—Thomas P. O'Hare
Attorney, Agent, or Firm—Hirons, Rogers & Scott

[57] ABSTRACT

The invention provides a two-terminal flasher device, particularly for flashing automobile lamps, that can replace the thermal devices predominantly currently in use. An electro-mechanical relay is used to flash the lamps, while an electronic circuit controls the flashing rate. The power for operating the relay and the electronic circuit is maintained by means of a capacitor that is charged from the power source (the battery) and then discharged while the power source is not available, the electronic circuit being supplied from the capacitor via a constant voltage source. Preferably the charging of the capacitor is arranged so as to give an "instant-on" type of operation. The lamp current is measured by a voltage measuring means including a resistor formed by part of the copper of the board on which the circuit is mounted, and the temperature coefficient of the circuit is arranged to be as close as possible to that of the copper. Upon detection of a lamp failure the flashing rate is doubled by by-passing a divider in a timing chain of the circuit. The current supplied to the relay coil is controlled so that a relatively high closing current is supplied initially to close the relay contacts; upon closure of the contacts the relay current is lowered to a holding value (e.g. about one fifth of the closing value) reducing the relay power consumption and capacity required for the capacitor.

13 Claims, 5 Drawing Figures

FLASHER DEVICES FOR LAMPS

FIELD OF THE INVENTION

The present invention is concerned with improvements in or relating to flasher devices for flashing one or more lamps such as are used, for example, to control the flashing of vehicle lamps for hazard warning and/or indicating a change in direction of the vehicle.

REVIEW OF THE PRIOR ART

Flasher devices of the so-called thermal type have been used extensively in the automotive field, principally because of their low cost coupled with an acceptable degree of reliability. However, electronic devices have a number of advantages over the thermal type, for example, they are generally more stable and reliable, the same device can be used for both direction indication and hazard warning, and it is possible to provide an indication of lamp outage by increase of the lamp flashing rate. Therefore, a number of attempts have been made to provide a flasher device in which the flashing rate is controlled by an electronic circuit. The use of an electronic circuit device to control the lamp current is generally not economic at this time, owing to the large current to be switched and the cost of solid state devices of the necessary current rating, but this situation can of course change rapidly in the future.

The standard thermal flasher device has only two terminals for its connection into its lamp circuit, one for connection to the battery and the other to the lamps to be flashed. The device may include a third terminal for operation of a separate pilot light, but nevertheless in the industry it will still be referred to as a "two-terminal" device. The majority of automobiles presently manufactured are wired to use a two-terminal device, and consequently any attempt to market other than such a device is inherently extremely difficult. The principal problem involved in designing a two-terminal flasher device employing an electronic circuit is that the device has a substantial voltage drop across it only while its lamp controlling relay is open and the lamps unlit; as soon as the relay closes its impedance decreases virtually to zero and consequently so does the voltage across it. In fact it is an industry requirement that the voltage drop introduced by the flasher device while the lamps are lit is not more than 0.6 volt, and this is too small to power any presently commercially economic electronic circuit, bearing in mind that the product is highly cost competitive; presently available inexpensive electronic circuits require about 3 volts for their operation. Consequently a voltage sufficient to operate the electronic circuit is only available between the terminals while the lamps are not lit, and the absence of power while the lamps are lit makes the device inoperable. This difficulty does not exist if a third ground terminal is provided, since the battery voltage is then always available between the battery and ground terminals.

One attempt to provide a two-terminal electronic flasher device is described in U.K. Pat. No. 1,383,826 of Philips Electronic and Associated Industries Limited. The device described includes an electromagnetic relay switch having a low-resistance holding winding connected in series with the relay switch terminals between the two device terminals, so that they will be connected in series with the battery and the lamps to be flashed. A series combination of a diode and a capacitor are also connected between the device terminals in parallel with the holding winding and relay switch terminals, and one end of a high resistance energising winding is connected to the same terminal as the diode, while a multivibrator is arranged to connect the other end of the energising winding to one end or the other of the capacitor. Closure of the automobile directional switch causes current to flow in the energising winding to close the relay contacts and light the lamps; at this time the capacitor is charging. When the relay contacts close, the current through the energising winding ceases, but the relay is now held in by the field of the holding winding through which the lamp current passes. After a "lamp lit" period set by the multivibrator the capacitor is connected by the multivibrator to supply current to the energising winding, producing a field opposing that of the holding winding sufficient to release the relay and extinguish the lamps.

DEFINITION OF THE INVENTION

It is therefore an object of the invention to provide a new "two terminal" flasher device for lamps, in which the flashing rate is controlled by an electronic circuit.

It is another object to provide such a device with which the lamps flash "instant-on" upon closure of the external directional switch.

In accordance with the present invention there is provided a flasher device for lamps and of the two-terminal type comprising:

(a) first and second device terminals for connection respectively to a power source and to a lamp to be flashed by the device;

(b) relay means having a pair of realy terminals that are connected between the first and second device terminals for the passage of lamp lighting current from the first to the second device terminals; and (c) electronic timing circuit means connected to the relay means and determining the duty cycle period for which the relay terminals are connected and disconnected upon closure of a lamp actuating switch of a flasher circuit in which the flasher device is connected;

(d) the device including a capacitor connected to the first device terminal for supply of charging current thereto upon closure of the lamp actuating switch during an initial inhibit period of the duty cycle, and while the relay terminals are disconnected;

(e) the capacitor being connected to the relay means at the end of the initial inhibit for supply of holding current thereto for holding the relay terminals connected after they have been connected; and (f) the capacitor being connected to the timing circuit means for supply of operating current thereto at least while the relay terminals are connected.

DESCRIPTION OF THE DRAWINGS

A flasher device which is a particular preferred embodiment of the invention will now be described, by way of example, with reference to the accompanying diagrammatic drawings wherein.

DESCRIPTION OF THE PREFERRED EMBODIMENTS

Figure 1:
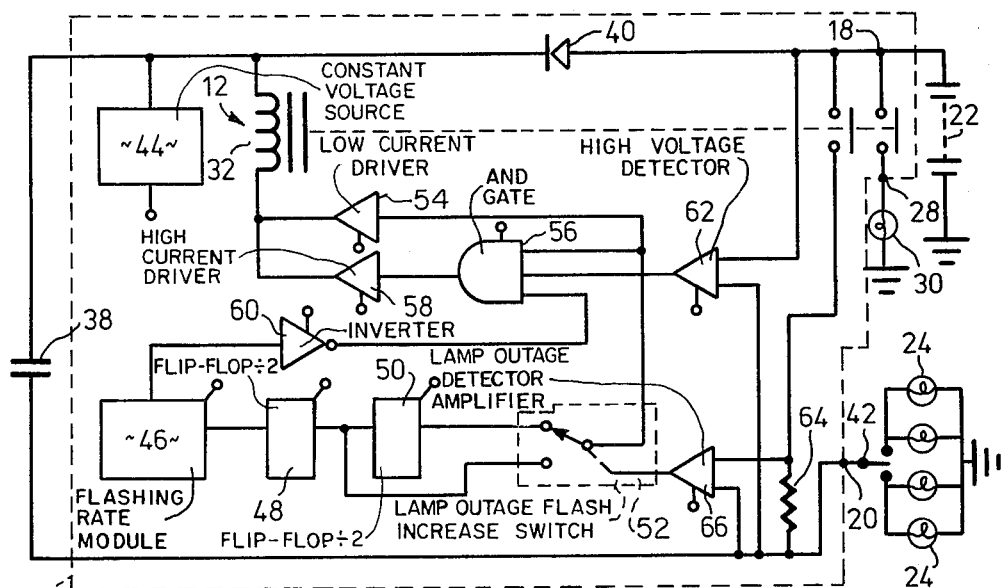
FIG. 1 is a schematic circuit diagram of the device.
Figure 2:
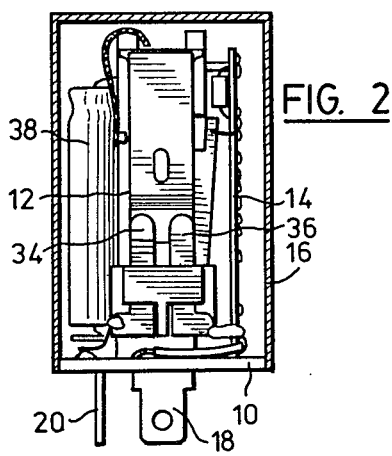
FIGS. 2 and 3 are different side elevations of the device itself to show the physical arrangement of the principal components thereof.
Figure 3:
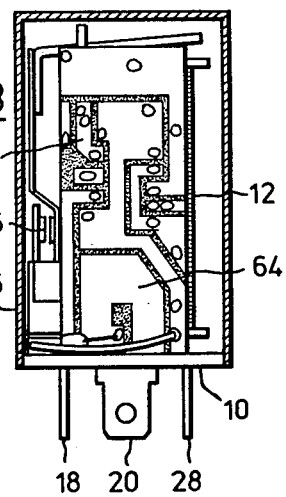

Referring first particularly to FIGS. 2 and 3, a device of the invention typically comprises an insulating base 10 on which is mounted an electromagnetic relay 12 and a circuit board 14 enclosed by a cylindrical casing 16. The base carries two device terminals 18 and 20 by which the device is connected respectively to a power source, constituted with this embodiment by a 12 volt automotive battery 22, and to the signal lamps 24 to be flashed. In FIG. 1 the enclosure constituted by the base 10 and casing 16 is indicated by a broken line 26. The base carries a third terminal 28 by which the device is connected to a pilot light 30. The relay 12 has a single high-impedance energising winding 32 (e.g. about 80-150 ohms) and pairs of relay contacts 34 and 36 operated in known manner by the relay armature, the latter pair controlling the flashing of the pilot light 30. A capacitor 38 has one terminal connected to the device terminal 18 via a diode 40 and the other terminal connected to the device terminal 20. The flashing of the lamps 24 is initiated by closure of the usual hand-operated directional actuating switch 42.

Immediately upon closure of the switch 42 the capacitor 38 beings to charge through the diode 40. The circuit components of the electronic circuit are all supplied with operating current from a constant voltage power supply 44 that maintains a constant output of about 3 volts as long as a supply of 3 volts or more is fed to it. The voltage fed to the circuit 44 reaches 3 volts almost immediately and all of the electronic circuits then immediately are active. The rate of flashing of the device is controlled by a flashing rate module 46, which can be any known oscillator circuit. This module generates a signal four times the required normal flashing rate of about 90 per second, which signal is fed to a chain of two flip-flop divider modules 48 and 50, so that a final signal of the required normal rate is obtained (i.e. on and off periods of about 330 milliseconds length) and is fed via a switch 52 directly to a low current relay control means or driver 54, and via the switch 52 and an AND logic module 56 to a high current controllable relay control means or driver 58.

The modules 46 and 50 are so arranged that their output signals are at the beginning of the "lamp-on" part of the duty cycle when they are switched on, the output from module 46 passing through inverter 60, and these signals are fed immediately to the AND module 56 and relay control means 54. The "on" output signal from module 46 has a duration of one eighth of 330 milliseconds namely about 42 milliseconds, and during this initial so-called "inhibit" period the control means 54 is active and the control means 58 inactive, whereupon a current of a value too low for the relay to close is fed to the winding 32, while the capacitor charges. The driver 58 can only become active when the AND module 56 receives a signal at all three of its inputs, two of which are from the switch 52 and inverter 60, and the third of which is the output from a voltage detector means 62. This detecter is connected between the terminals 18 and 20 and feeds an output to the AND module 56 when the voltage at terminal 18 is at a predetermined minimum value, typically at about 8 volts.

When all three of the required signals are fed to the AND module 56 the driver 58 is activated and feeds a much higher current to the relay winding, sufficient to ensure its rapid closing. The length of the inhibit period set by the module 46 is sufficient to ensure that the capacitor will charge sufficiently for its subsequent task, while the detector means 62 ensures that no attempt can be made to close the relay until there is adequate voltage available for the task. When the conditions are completely appropriate therefore the relay closes positively. In a typical embodiment the current provided by the driver 54 will be about 25 milliamps, while that provided by the driver 58 is about 125 milliamps.

Figure 4:
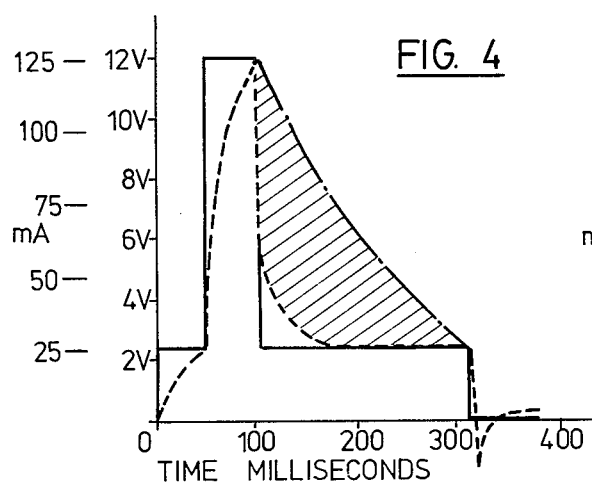
FIG. 4 is a graph showing the change with time of energising voltage (solid line) applied to the relay coil and the resultant current (broken line) through it.

FIG. 4 is believed to show clearly this aspect of the operation of the circuit, the solid line showing the value of the voltage applied to the winding 32, while the broken line shows the value of the corresponding current through the winding. Thus, during the "inhibit" period of approximately 40 milliseconds a low voltage is applied by the driver 54, and the current increases with the usual exponential characteristic. At the end of the period the maximum voltage, consisting of the battery voltage less the voltage drop across the diode 40, is applied and the current increases to the new higher relay closing value.

As soon as the contacts 34 close and the lamps 24 light the voltage between terminals 18 and 20 falls drastically and the capacitor 38 begins to discharge through the relay winding 32, the charging path being blocked by diode 40; the relay contacts close somewhat ahead of the end of movement of the relay armature carrying the movable contacts, and some of the current supplied by the discharging capacitor will assist in completing this movement and must be regarded as relay closing current. The detector means 62 detects this voltage decrease between terminals 18 and 20 and its signal to the AND module is no longer true, so that the relay control means 54 is active to reduce the voltage across the winding and the flow of current therethrough to the lower values determined by the control means, these values being ample to hold the relay in closed condition. The control means 54 then maintains this holding current substantially constant at the lower value, while the capacitor discharges, decreasing considerably the amount of power required from the capacitor. As mentioned above, in this specific embodiment the holding current required is only about 25 milliamps instead of the closing current of 125 milliamps, and the period during which the high value closing current is applied is only about 20 milliseconds.

At the end of the "lamp on" duty period of about 330 milliseconds set by the final flip-flop 52 the relay drive means 54 is made inactive, reducing the relay holding current to zero whereupon the relay contacts open to extinguish the lamps. It will be seen that the AND module 54 ensures that the faster-operating signal from the circuit 46 cannot now enable the high current control means 58 during the "lamp-out" period of the duty cycle, this period also lasting about 330 milliseconds. The duty cycle then repeats. It will be seen that this ability of the circuit to control the current in the winding 32 reduces very considerably the size of the capacitor 38 that is required, and follows from the fact that the magnetic field required to hold the relay closed is considerably less than that needed to close it, in this embodiment by a factor of about five. The area below the broken current line in FIG. 4 is representative of the power consumed by the relay of the invention, while the chain dotted line shows the possible current flow in the absence of this dual-level operation, which would follow the normal exponential decay curve obtained as a capacitor discharges. The shaded area therefore represents the decreases in power consumed. In this specific embodiment it was found that the size of the capacitor 38 could be decreased from about 1000 mfd to about 680 mfd.

It will be apparent that the invention will still provide a substantial benefit if the relay holding current is simply reduced to a lower holding value instead of to a constant value by a constant current device, this lower holding value decreasing progressively as the capacitor discharges. The arrangement must of course be such that the decreasing holding current will not go below the minimum holding value by the end of the lamp-on cycle period, when the relay contacts must open.

It will be seen that with the circuit described the lamps are lit about 40 milliseconds after closure of the switch 42, and to the observer they will appear to light instantly; this "instant-on" type of operation is highly desirable and fully justifies the added expense represented by the voltage detector 62. The invention is also applicable to a circuit with which the closure of the switch 42 is followed by the "lamp-out" part of the duty cycle, when the voltage detector 62 will not be required, since the capacitor has a complete half cycle of about 330 milliseconds to charge.

A device of the invention is further provided with a detector resistor 64 which has a differential amplifier comparator module 66 connected across it, this module producing a signal that is fed to the switch 52 to control it. The resistor 64 is traversed by the current passing through the lamps and the voltage drop across it will therefore depend upon the current drawn by the lamps. Upon failure of one of the lamps the voltage applied to the amplifier 66 decreases; the resultant signal fed to the switch 52 actuates it to shunt the flip-flop divider 50, so that instead the double-rate signal from the flip-flop divider 48 is fed to the relay drive means 54 and 58, whereupon the flashing rate is doubled to about 180 flashes per minute, indicating to the driver that a lamp is out. This is a most desirable feature and is becoming an essential requirement in many markets.

A further feature of this particular embodiment is that the detector resistor 64 is formed from part of the copper of the circuit board 14, so that a separate element is not required and the resistor maintains a very uniform temperature balance with its environment. The electronic circuit is then designed to have a temperature coefficient as close as possible to that of the copper of the board, so that temperature stabilization is more readily achieved. In a particular embodiment the value of the resistor 64 is only 3.3 milliohms instead of a more usual value with prior art circuits of about 10 milliohms, and the circuit element 66 is sensitive to ±1 millivolt. A circuit employing four lamps 24 will produce a voltage of about 15 millivolts when any two lamps are lit; it will be seen therefore that there is adequate sensitivity to detect the failure of a single lamp. There is also adequate sensitivity to detect the failure of one lamp in three.

Although in this embodiment a single timing chain 46-50 is employed and signals taken from different parts of the chain, it will be apparent that separate timing circuits could equally well be employed. Moreover, although for convenience in description and clarity in explaining the operation of the invention the electronic circuit is shown as comprising separate modules, it will be understood by those skilled in the art that a number or all of these modules may be combined together in a single integrated circuit.

At the present state of the relay art an electromechanical relay is still the most economical device for switching the large lamp currents involved, and such a device inherently requires a smaller holding current than closing current, but the invention is also applicable to any other type of relay device in which the holding current required can be less than the closing current. Such a relay device may not employ moving contacts and for this reason in the claims the relay terminals are referred to as connected and disconnected, which correspond to the closed and open conditions respectively of an electromechanical relay.

Figure 5:
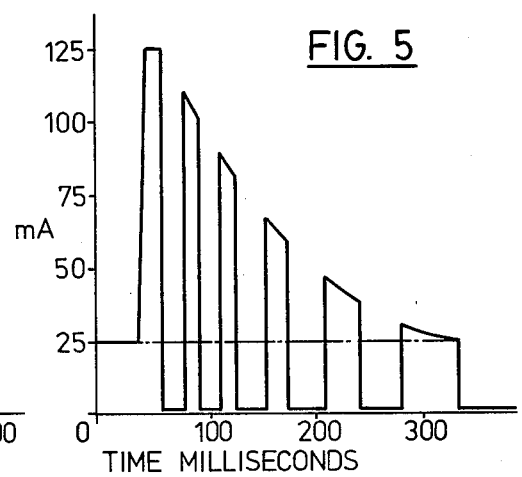
FIG. 5 is a graph of change of current with time, similar to FIG. 4, to illustrate a switching mode arrangement for supplying holding current to the relay coil.

Reference is made to FIG. 5 to show an alternative switching mode of operation of a single relay control module to obtain effectively the required high closing current and the lower holding current. In this switching mode the value of the current supplied to the relay winding by the capacitor decreases exponentially with the usual decay characteristic, and the single module is switched on for progressively longer periods of time as the current available decreases so that the required magnetic field is maintained in the relay core until the end of the duty cycle period is reached. This manner of achieving a constant average current is generally more complex to implement but also is usually more efficient in operation.

It will be seen that the invention provides a flasher device employing an electronic timing circuit that is a completely satisfactory replacement for the existing two terminal thermal devices.

I claim:
1. A flasher device for lamps and of the two-terminal type comprising:
   (a) first and second device terminals for connection respectively to a power source and to a lamp to be flashed by the device;
   (b) relay means having a pair of relay terminals that are connected between the first and second device terminals for the passage of lamp lighting current from the first to the second device terminals; and
   (c) electronic timing circuit means connected to the relay means and determining the duty cycle period for which the relay terminals are connected and disconnected upon closure of a lamp actuating switch of a flasher circuit in which the flasher device is connected;
   (d) the device including a capacitor connected to the first device terminal for supply of charging current thereto upon closure of the lamp actuating switch and during an initial inhibit period of the duty cycle period while the relay terminals are disconnected;
   (e) the capacitor being connected to the relay means at the end of the initial inhibit period for supply of holding current thereto for holding the relay terminals connected after they have been connected; and
   (f) the capacitor being connected to the timing circuit means for supply of operating current thereto at least while the relay terminals are connected.

2. A device as claimed in claim 1, wherein the relay means is of a type with which the operating current for connecting the relay means terminals is greater than the operating current for maintaining the terminals connected, and the circuit means includes relay control means for controlling the relay operating current, and detector means detecting the connection of the relay terminals and causing operation of the relay control means to reduce the operating current from the connecting value to the holding value upon detection that the terminals are connected.

3. A device as claimed in claim 2, wherein the relay control means is operative upon detection that the relay means terminals are connected to maintain the relay means operating current at a substantially constant holding value.

4. A device as claimed in claim 3, wherein the relay control means maintains the relay means operating current at the said substantially constant holding value by timed switching of the power obtained from the capacitor.

5. A device as claimed in claim 2, wherein the said relay means is an electromagnetic relay having a relay winding connected to the said capacitor to be supplied with at least holding current therefrom and having relay contacts that are connected closed and disconnected open by movement of the relay armature.

6. A device as claimed in claim 1, wherein the timing circuit means includes a constant voltage power supply means connected to the capacitor to receive power therefrom at the voltage available therefrom and connected to the remainder of the timing circuit means to supply power thereto at a constant voltage.

7. A device as claimed in claim 1, and providing instant-on flashing of the lamp to which it is connected, wherein the timing circuit means includes;
    relay control means for controlling the relay operating current, and
    timing means connected to the relay control means and preventing feeding of closing current to the relay means during said initial inhibit capacitor charging period of each lamp-on duty cycle period.

8. A device as claimed in claim 7, wherein the timing circuit means includes a single timing chain consisting of a frequency generator and frequency dividers fed from the frequency generator, and wherein a signal for determining the said initial inhibit capacitor charging period is obtained from the frequency generator, and a signal for determining the duty cycle of the device is obtained from a subsequent frequency divider.

9. A device as claimed in claim 8, wherein the timing device circuit means includes an AND gate through which the signals from said signal generator and said subsequent frequency divider are fed to the relay control means, so that the faster operating signal from the frequency generator is ineffective during the lamp-off duty cycle period.

10. A device as claimed in claim 1, wherein the said timing circuit means includes voltage detector means connected between the device terminals to detect the voltage therebetween, the voltage detector means being connected to the relay control means and preventing feeding of closing current to the relay means until the voltage has reached a predetermined minimum value with corresponding charging of the capacitor.

11. A device as claimed in claim 1, wherein the timing circuit means includes means detecting the flow of lamp current between the relay means terminals, and means responsive to detection of a decrease in current corresponding to failure of a lamp to increase the flashing rate by decreasing the duty cycle periods for which the relay means terminals are connected and disconnected.

12. A device as claimed in claim 11, wherein the timing circuit means includes a timing chain consisting of a frequency generator and at least one frequency divider fed from the frequency generator, and switch means connected to two different signal outputs of the timing chain, the lamp current detecting means controlling the switch means to supply the faster operating signal from the respective output to the relay control means upon detection of a decrease in lamp current corresponding to failure of a lamp.

13. A device as claimed in claim 11, wherein the said means detecting the flow of lamp current includes a resistor constituted by part of the copper of a circuit board on which the timing means circuit is mounted, and detector means connected across the resistor and measuring the voltage drop produced by the current passing therethrough.

* * * * *